United States Patent

Shimomura et al.

[11] Patent Number: 5,964,876
[45] Date of Patent: Oct. 12, 1999

[54] PROGRAM-INVOCATION-COUNT MEASURING SYSTEM, PROGRAM-INVOCATION-COUNT MEASURING METHOD, AND MEDIUM FOR STORING PROGRAM-INVOCATION-COUNT MEASURING SOFTWARE

[75] Inventors: Eisuke Shimomura; Munehiro Yoshida, both of Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 08/968,073

[22] Filed: Nov. 12, 1997

[30] Foreign Application Priority Data

Jun. 16, 1997 [JP] Japan .................................. 9-159003

[51] Int. Cl.[6] .................................................. G06F 12/14
[52] U.S. Cl. .................. 713/200; 714/38; 380/4
[58] Field of Search .............................. 714/38; 395/704, 395/705, 701, 702, 703, 712; 713/200, 201; 380/3, 4, 25, 30

[56] References Cited

U.S. PATENT DOCUMENTS

| | | | |
|---|---|---|---|
| 4,652,990 | 3/1987 | Pailen et al. | 380/4 |
| 4,740,890 | 4/1988 | William | 380/4 |
| 4,937,863 | 6/1990 | Robert et al. | 380/4 |
| 5,023,907 | 6/1991 | Johnson et al. | 380/4 |
| 5,260,999 | 11/1993 | Wyman | 380/4 |

FOREIGN PATENT DOCUMENTS 7219763  8/1995  Japan .

Primary Examiner—Robert W. Beausoliel, Jr.
Assistant Examiner—Pierre Eddy Elisca
Attorney, Agent, or Firm—Leydig, Voit & Mayer, Ltd.

[57] ABSTRACT

In a program-invocation-count measuring system, first and second identification codes are acquired and exchanged among processes as a broadcast or response signal. The first identification code is used for determining whether there are currently active processes which have been activated by invoking the same program. On the other hand, the second identification code is used for determining whether a response signal received by a process is the same as a broadcast signal transmitted earlier by the process.

9 Claims, 3 Drawing Sheets

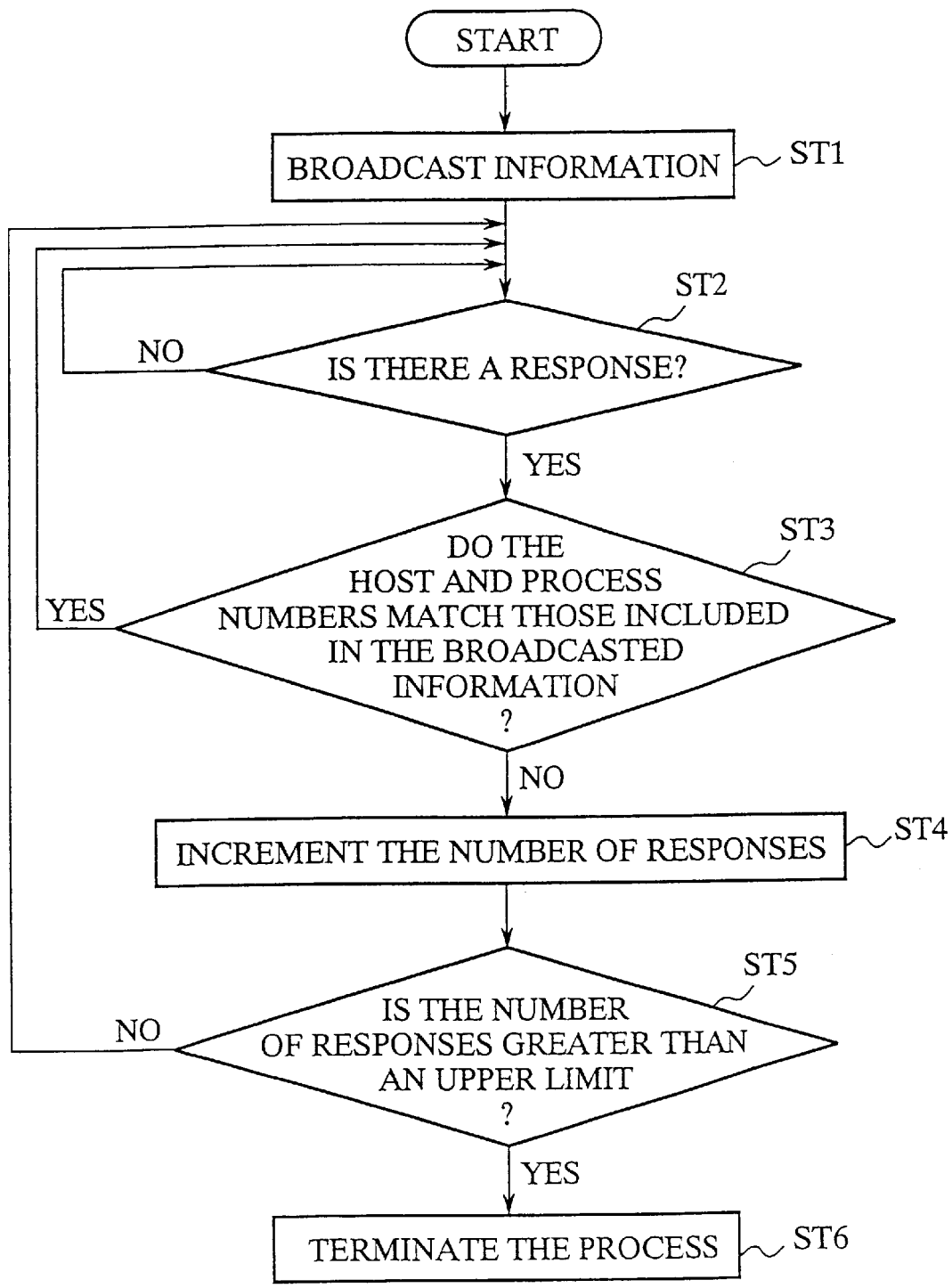

PROGRAM-INVOCATION-COUNT MEASURING SYSTEM, PROGRAM-INVOCATION-COUNT MEASURING METHOD, AND MEDIUM FOR STORING PROGRAM-INVOCATION-COUNT MEASURING SOFTWARE

BACKGROUND OF THE INVENTION

1. Field of the Invention

The present invention relates to a program-invocation-count measuring system a program-invocation-count measuring method for measuring the number of simultaneously active processes activated by invoking the same program in a network or a computer, and a medium for storing program-invocation-count measuring software.

2. Description of the Prior Art

When a program is sold to a buyer as a product, normally, a usage license contract is made with the buyer to limit the number of simultaneously active processes activated by invoking the program and to approve only the number of processes within a limit specified in the contract. In addition, if a plurality of processes are operated at the same time by invoking the same program, it may be impossible for the processes to display the designed performance of the program. For this and other reasons, there is also provided a program having a function to limit the number of simultaneously active processes activated by invoking the program.

In order to limit the number of simultaneously active processes activated by invoking the same program or the number of active invocations of the program as described above, it is necessary to detect an operation of a program beyond the terms specified in a contract made with the user. Traditionally, a special program such as a license server for measuring the number of simultaneously active processes activated by invoking the same program is therefore used or, as an alternative, the program supplier issues a license key that allows the program to operate only in an environment of the user.

Since the conventional program-invocation-count measuring system, the conventional program-invocation-count measuring method and the conventional medium for storing program-invocation-count measuring software are configured as described above, a special program such as a license server for measuring the number of simultaneously active processes activated by invoking the same program is used or, as an alternative, a procedure such as a license key is required between the user and the supplier to make sure that the program is used by the user in accordance with the usage license contract. Nevertheless, a special procedure for measuring the number of simultaneously active processes is required.

SUMMARY OF THE INVENTION

In view of the problem described above, it is an object of the present invention to provide a program-invocation-count measuring system, program-invocation-count measuring method capable of measuring the number of simultaneously active processes activated by invoking the same program without requiring a special program or a special procedure and a medium for storing program-invocation-count measuring software.

In order to achieve the object of the present invention described above, according to a first aspect of the present invention, there is provided a program-invocation-count measuring system comprising:

a first identification-code acquiring means for acquiring a first identification code assigned to a program and used for distinguishing the program from other programs;

a second identification-code acquiring means for acquiring a second identification code from a host computer wherein the second identification code is assigned to a process activated in the host computer by invoking the same program and used for distinguishing the process from other processes activated in the host computer by invoking the same program;

a broadcasting means for broadcasting a broadcast signal including the first and second identification codes acquired by the first and second identification-code acquiring means respectively;

a first receiving means for receiving the broadcast signal broadcasted by the broadcasting means;

a first judging means for forming a first judgment as to whether or not a first identification code included in the broadcast signal received by the first receiving means matches a first identification code assigned to a program invoked for a process currently executing the first judging means;

a responding means for transmitting a second identification code assigned to a process currently executing the responding means and a first identification code assigned to a program invoked for the process as a response signal if an outcome of the first judgment formed by the first judging means indicates that the first identification codes match each other;

a second receiving means for receiving the response signal transmitted by the responding means;

a second judging means for forming a second judgment as to whether or not the response signal received by the second receiving means is the same as the broadcast signal broadcasted by the broadcasting means; and a counting means for counting the number of response signals received by the second receiving means by incrementing the number of response signals by one if an outcome of the second judgment formed by the second judging means indicates that the response signal received by the second receiving means is not the same as the broadcast signal broadcasted by the broadcasting means.

As a result, there is exhibited an effect that the number of simultaneously active processes activated by invoking the same program with the same identification number can be counted without using a special program or a procedure.

According to a second aspect of the present invention, the program-invocation-count measuring system described above further comprises a third identification-code acquiring means for acquiring a third identification code for distinguishing a host computer for executing a program from other host computers. As a result, there is exhibited an effect that the program-invocation-count measuring system can be used in a network.

According to a third aspect of the present invention, the program-invocation-count measuring system described above further comprises:

a third judging means for forming a third judgment as to whether or not the number of response signals counted by the counting means has exceeded a predetermined upper limit; and an operation terminating means for terminating an operation of a process currently executing the third judging means if an outcome of the third judgment formed by the third judging means indicates that the counted number of response signals has exceeded the predetermined upper limit.

As a result, there is exhibited an effect that limitation on the number of simultaneously active processes activated by invoking the same program can be implemented automatically.

According to a fourth aspect of the present invention, there is provided a program-invocation-count measuring method comprising:

a first identification-code acquiring step for acquiring a first identification code assigned to a program and used for distinguishing the program from other programs;

a second identification-code acquiring step for acquiring a second identification code from a host computer wherein the second identification code is assigned to a process activated in the host computer by invoking the same program and used for distinguishing the process from other process activated in the host computer by invoking the same program;

a broadcasting step for broadcasting a broadcast signal including the first and second identification codes acquired at the first and second identification-code acquiring steps respectively;

a first receiving step for receiving the broadcast signal broadcasted at the broadcasting step;

a first judging step for forming a first judgment as to whether or not a first identification code included in the broadcast signal received at the first receiving step matches a first identification code assigned to a program invoked for a process currently executing the first judging step;

a responding step for transmitting a second identification code assigned to a process currently executing the responding step and a first identification code assigned to a program invoked for the process as a response signal if an outcome of the first judgment formed at the first judging step indicates the first identification codes match each other;

a second receiving step for receiving the response signal transmitted at the responding step;

a second judging step for forming a second judgment as to whether or not the response signal received at the second receiving step is the same as the broadcast signal broadcasted at the broadcasting step; and a counting step for counting the number of response signals received at the second receiving step by incrementing the number of response signals by one if an outcome of the second judgment formed at the second judging step indicates that the response signal received at the second receiving step is not the same as the broadcast signal broadcasted at the broadcasting step.

As a result, there is exhibited an effect that the number of simultaneously active processes activated by invoking the same program with the same identification number can be counted without using a special program or a procedure.

According to a fifth aspect of the present invention, the program-invocation-count measuring method described above further comprises a third identification-code acquiring step for acquiring a third identification code for distinguishing a host computer for executing a program from other host computers. As a result, there is exhibited an effect that the program-invocation-count measuring method can be adopted in a network.

According to a sixth aspect of the present invention, the program-invocation-count measuring method described above further comprises:

a third judging step for forming a third judgment as to whether or not the number of response signals counted at the counting step has exceeded a predetermined upper limit; and an operation terminating step for terminating an operation of a process currently executing the third judging step if an outcome of the third judgment formed at the third judging step indicates that the counted number of response signals has exceeded the predetermined upper limit.

As a result, there is exhibited an effect that limitation on the number of simultaneously active processes activated by invoking the same program can be implemented automatically.

According to a seventh aspect of the present invention, there is provided a recording medium for recording program-invocation-count measuring software for:

acquiring a first identification code assigned to a program and used for distinguishing the program from other programs;

acquiring a second identification code from a host computer, the second identification code assigned to a process activated in the host computer by invoking the same program and used for distinguishing the process from other process activated in the host computer by invoking the same program;

broadcasting a broadcast signal including the first and second identification codes;

receiving the broadcast signal;

forming a first judgment as to whether or not a first identification code included in the broadcast signal received at the first receiving step matches a first identification code assigned to a program invoked for a process currently forming the first judgment;

transmitting a second identification code assigned to a process currently transmitting the second identification code and a first identification code assigned to a program invoked for the process as a response signal if an outcome of the first judgment indicates that the first identification codes match each other;

receiving the transmitted response signal;

forming a second judgment as to whether or not the response signal is the same as the broadcast signal; and counting the number of received response signals by incrementing the number of received response signals by one if an outcome of the second judgment indicates that the response signal is not the same as the broadcast signal.

As a result, there is exhibited an effect that, by employing this recording medium, the number of simultaneously active processes activated by invoking the same program with the same identification number can be counted without using a special program or a procedure.

According to an eighth aspect of the present invention, the recording medium for storing program-invocation-count measuring software described above is further used for acquiring a third identification code for distinguishing a host computer for executing a program from other host computers. As a result, the recording medium can be employed in a computer in a network.

According to a ninth aspect of the present invention, the recording medium for storing program-invocation-count measuring software described above is further used for:

forming a third judgment as to whether or not the counted number of received response signals has exceeded a predetermined upper limit; and terminating an operation of a process currently forming the third judgment if an outcome of the third judgment indicates that the counted number of received response signals has exceeded the predetermined upper limit.

As a result, there is exhibited an effect that, by employing this recording medium, limitation on the number of simultaneously active processes activated by invoking the same program can be implemented automatically.

BRIEF DESCRIPTION OF THE DRAWINGS

The above and other objects as well as many of the attendant advantages of the present invention will be readily appreciated as the same becomes completely understood from a study of the following detailed description with reference to accompanying drawings wherein:

FIG. 5 is a flowchart showing a broadcast subroutine of the program-invocation-count measuring system implemented by the second embodiment.

DETAILED DESCRIPTION OF THE PREFERRED EMBODIMENTS

Figure 1:
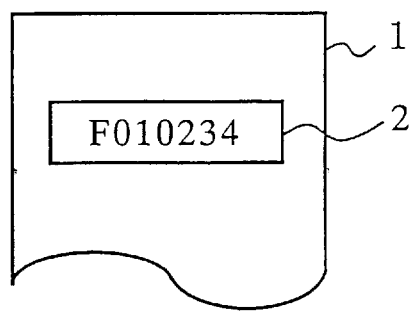
FIG. 1 is a conceptual diagram showing data preserved in a program file used in a program-invocation-count measuring system implemented by a first embodiment of the present invention.

The present invention will become more apparent from the following detailed description of some preferred embodiments with reference to the accompanying diagrams.
First Embodiment FIG. 1 is a conceptual diagram showing data preserved in a program file used in a program-invocation-count measuring system implemented by a first embodiment of the present invention. In the figure, reference numeral 1 denotes a program file stored in a storage unit employed in a host computer in the program-invocation-count measuring system. Reference numeral 2 is an identification number (a first identification code) for distinguishing a program in the program file 1 from other programs. The identification number 2 is also included in the program file 1. It should be noted that the program-invocation-count measuring system operates in a network.

Figure 2:
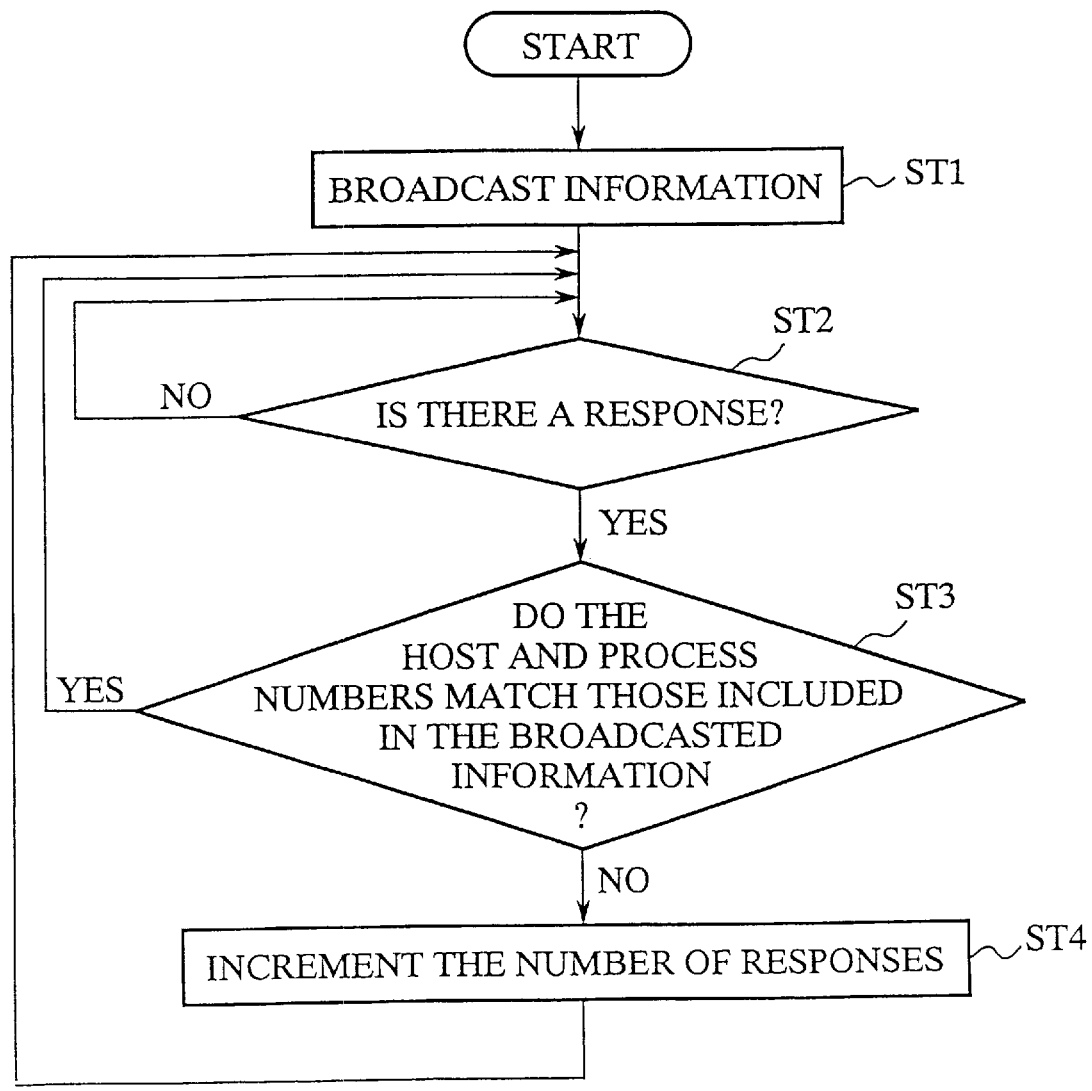
FIG. 2 is a flowchart showing a broadcast subroutine of the program-invocation-count measuring system implemented by the first embodiment.
Figure 3:
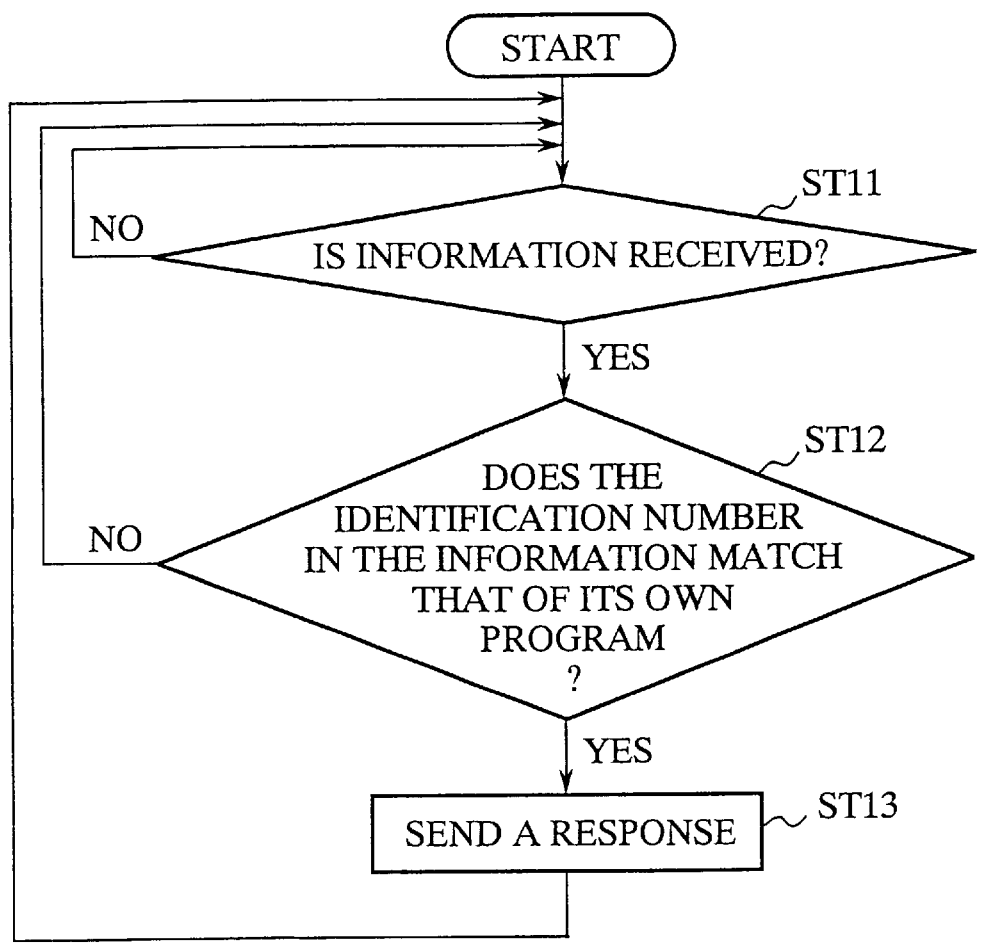
FIG. 3 is a flowchart showing a response subroutine of the program-invocation-count measuring system implemented by the first embodiment.

Next, operations of the program-invocation-count measuring system are explained by referring to flowcharts shown in FIGS. 2 and 3.

In the program-invocation-count measuring system, first of all, when execution of the program of the program file 1 in a host computer is started, the program acquires a host number (a third identification code) of the host computer in which the program is to be executed and a process number (a second identification code) of the process activated by invoking the program itself from an operating system of the host computer generating the program.

Then, the program calls a broadcast subroutine for measuring the number of simultaneously active processes activated by invoking the same program at any time. FIG. 2 is a flowchart showing the broadcast subroutine for measuring the number of simultaneously active processes activated by invoking the same program. As shown in the figure, the subroutine for measuring the number of simultaneously active processes activated by invoking the same program begins with a step ST1 to broadcast information such as the host number and the process number acquired in advance and the identification number 2 included in the program file 1. The flow of the subroutine then goes on to a step ST2 to wait for a response from another process activated by invoking the same program which is currently running on another computer in the network.

On the other hand, the program also has a response subroutine for generating a response to information broadcasted by another computer to notify the other computer that the information has been received. The response subroutine is called when information broadcasted by another computer is received. FIG. 3 is a flowchart showing the response subroutine.

To be more specific, if there is another computer in the network which is executing the same program, the response routine of the program in the other program is normally put in a wait state at a step ST11 of the flowchart shown in FIG. 3. As the information broadcasted by the host computer is received, the response routine goes on to a step ST12 to form a judgment as to whether or not the identification number included in the information broadcasted by the host computer matches an identification number stored in its own program file.

If the identification number included in the information broadcasted by the host computer matches an identification number stored in its own program file, the flow of the subroutine proceeds to a step ST13 to send the host number of the other computer, the process number of a process currently executing the response subroutine and the identification number of the same program to broadcasting process executed by the broadcasting host computer as a response. It should be noted that the broadcasting process and the broadcasting host computer are identified by the process number and the host number respectively which are included in the broadcasted information. The flow then returns to the step ST11 to get in a state waiting for next broadcasted information.

If the outcome of the judgment formed at the step ST12 indicates that the identification number included in the information broadcasted by the host computer does not match an identification number stored in its own program file, on the other hand, the flow returns to the step ST11 to get in a state waiting for next broadcasted information without sending a response.

In the program running on the broadcasting host computer, when the broadcast subroutine receives the response at the step ST2 of the flowchart shown in FIG. 2, the flow continues to a step ST3 to compare the host number and the process number included in the response with the host number of the broadcasting host computer and the process number of a process executing the broadcast subroutine. If the host number and the process number included in the response match the host number of the broadcasting host computer and the process number of the process executing the broadcast subroutine, the flow of the subroutine returns to the step ST2 to wait for a next response without carrying out any processing because the response is just what is broadcasted by the program running on the broadcasting host computer itself. If the host number and the process number included in the response do not match the host number of the broadcasting host computer and the process number of the process executing the broadcast subroutine, on the other hand, the flow goes on to a step ST4 to increment an activation-count measurement counter by one.

As described above, according to the first embodiment, the number of simultaneously active processes activated by invoking the same program with the same identification number can be counted without using a special measurement program such as a license server.

Second Embodiment

Figure 4:
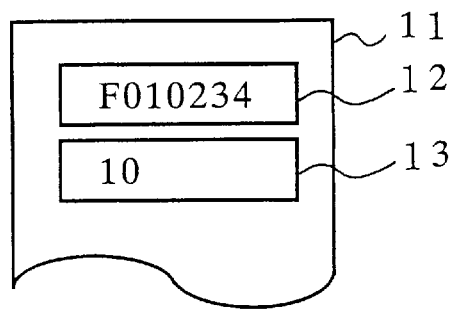
FIG. 4 is a conceptual diagram showing data preserved in a program file used in a program-invocation-count measuring system implemented by a second embodiment of the present invention.

FIG. 4 is a conceptual diagram showing data preserved in a program file used in a program-invocation-count measuring system implemented by a second embodiment of the present invention. In the figure, reference numeral 11 denotes a program file stored in a storage unit employed in a host computer in the program-invocation-count measuring system. Reference numeral 12 is an identification number (a first identification code) for distinguishing a program in the program file 11 from other programs. The identification number 12 is also included in the program file 11. Reference numeral 13 is an upper limit of the number of processes that can be activated by invoking the same program at the same time. It should be noted that the program-invocation-count measuring system also operates in a network as is the case with the program-invocation-count measuring system implemented by the first embodiment.

Next, operations of the program-invocation-count measuring system are explained by referring to a flowchart shown in FIG. 5.

Similar to the first embodiment, in the present program invocation-count measuring system implemented by the second embodiment, first of all, when execution of the program of the program file 11 in a host computer is started, the program acquires a host number (a third identification code) of the host computer in which the program is to be executed and a process number (a second identification code) of the process activated by invoking the program itself from an operating system of the host computer generating the program.

Then, the program also calls a broadcast subroutine for measuring the number of simultaneously active processes activated by invoking the same program at any time as is the case with first embodiment. FIG. 5 is a flowchart showing the broadcast subroutine for measuring the number of simultaneously active processes activated by invoking the same program. Operational steps of the flowchart shown in FIG. 5 identical with those of the broadcast subroutine of the first embodiment for measuring the number of simultaneously active processes activated by invoking the same program shown in FIG. 2 are denoted by the same reference numerals and the description of the operations carried out at those steps is omitted. In addition, since the response subroutine of the second embodiment is the same as that of the first embodiment shown in FIG. 3, its explanation is also omitted as well.

In the case of the second embodiment, after the number of responses is incremented at the step ST4, the flow of the subroutine goes on to a step ST5 to form a judgment as to whether or not the number of responses is greater than the upper limit 13 of the number of simultaneously active processes activated by invoking the same program which is stored in the program file 11. If the number of responses is equal to or smaller than the upper limit 13, the flow of the subroutine returns to the step ST2 to wait for a next response. If the number of responses is greater than the upper limit 13, on the other hand, the flow goes on to a step ST6 to terminate its own process.

As described above, the second embodiment exhibits an effect that the number of simultaneously active processes activated by invoking the same program having the same identification number can be limited to the upper limit 13 of the number of simultaneously active processes activated by invoking the same program.

As explained above, in both the first and second embodiments, the program-invocation-count measuring system operates in a network. It should be noted, however, that the program-invocation-count measuring system provided by the present invention can also be applied to the same host computer wherein a plurality of simultaneously active processes activated by invoking the same program are run. In this case, running at the same time on the same host computer, the processes activated by invoking the same program have the same host number. Thus, only process numbers are compared with each other in the judgment formed at the step ST3 to determine whether or not a response received by a process is the information broadcasted by the process itself.

In addition, the present invention can be implemented by storing the programs like the ones shown in the first and second embodiments in a recording medium such as a floppy disk, a CDROM or DVD.

While the present invention is explained by referring to embodiments, the explanation is not to be construed in a limiting sense. That is to say, the embodiments are no more than preferred embodiments. It is further understood by those skilled in the art that a variety of changes and modifications can be made to the embodiments without departing from spirit and the scope of the following appended claims.

What is claimed is:

1. A program-invocation-count measuring system for a computer, the system comprising:

first identification-code acquiring means for acquiring a first identification code assigned to a first program and used for distinguishing the first program from other programs second identification-code acquiring means for acquiring a second identification code from a host computer wherein the second identification code is assigned to a first process activated in the host computer by invoking the first program and is used for distinguishing the first process from other processes activated in the host computer by invoking the first program;

broadcasting means for broadcasting a broadcast signal including the first and second identification codes acquired by said first and second identification-code acquiring means, respectively;

first receiving means for receiving the broadcast signal broadcast by said broadcasting means;

first judging means for determining whether a first identification code included in the broadcast signal received by said first receiving means matches a first identification code assigned to a program invoked for a process currently executing said first judging means;

responding means for transmitting a second identification code assigned to a process currently executing said responding means and a first identification code assigned to a program invoked for the process as a response signal when said first judgment means determines that the first identification codes included in the broadcast signal and assigned to a program match;

second receiving means for receiving the response signal transmitted by said responding means;

second judging means for determining whether the response signal received by said second receiving means is identical to the broadcast signal broadcast by said broadcasting means; and counting means for counting the response signals received by said second receiving means and incrementing by one when said second judging means indicates that the response signal received by said second receiving means is not identical to the broadcast signal broadcasted by said broadcasting means.

2. The program-invocation-count measuring system for a computer according to claim 1 comprising third identification-code acquiring means for acquiring a third identification code for distinguishing a host computer for executing a program from other host computers.

3. The program-invocation-count measuring system for a computer according to claim 1 comprising:

third judging means for determining whether the response signals counted by said counting means has exceeded an upper limit; and operation terminating means for terminating an operation of a process currently executing said third judging means when said third judging means indicates that the counted response signals have exceeded the upper limit.

4. A program-invocation-count measuring method for a computer, the method comprising:

acquiring a first identification code assigned to a first program and used for distinguishing the first program from other programs;

acquiring a second identification code from a host computer wherein the second identification code is assigned to a first process activated in the host computer by invoking the first program and used for distinguishing the first process from other processes activated in the host computer by invoking the first program;

broadcasting a broadcast signal including the first and second identification codes;

receiving the broadcast signal;

making a first determination as to whether a first identification code included in the received broadcast signal matches a first identification code assigned to a program invoked for making the first determination;

transmitting a response signal including a second identification code assigned to a process currently transmitting the response signal and a first identification code assigned to a program invoked for the process when the first determination indicates that the first identification codes match;

receiving the response signal;

making a second determination as to whether the received response signal is the same as the broadcast signal; and counting the response signals received by incrementing by one when the second determination indicates that the received response signal is not the same as the broadcast signal.

5. The program-invocation-count measuring method for a computer according to claim 4 comprising acquiring a third identification code for distinguishing a host computer for executing a program from other host computers.

6. The program-invocation-count measuring method for a computer according to claim 4 comprising:

making a third determination as to whether counted response signals have exceeded an upper limit; and terminating an operation or a process currently making the third determination if the third determination indicates that the counted response signals have exceeded the upper limit.

7. A recording medium in a computer, recording program-invocation-count measuring software, the medium comprising:

means for acquiring a first identification code assigned to a first program and used for distinguishing the first program from other programs;

means for acquiring a second identification code from a host computer, the second identification code being assigned to a first process activated in the first host computer by invoking the first program and being used for distinguishing the process from other processes activated in the host computer by invoking the first program;

means for broadcasting a broadcast signal including the first and second identification codes;

means for receiving the broadcast signal;

means for making a first determination as to whether a first identification code included in the broadcast signal matches a first identification code assigned to a program invoked for a process currently making the first determination;

means for transmitting a response signal including a second identification code assigned to a process currently transmitting the second identification code and a first identification code assigned to a program invoked for the process when the first determination indicates that the first identification codes match;

means for receiving the transmitted response signal;

forming means for making a second determination as to whether the response signal is identical to the broadcast signal; and means for counting received response signals and incrementing by one when the second determination indicates that the response signal is not identical to the broadcast signal.

8. The recording medium in a computer, storing program-invocation-count measuring software according to claim 7 comprising means for acquiring a third identification code for distinguishing a host computer for executing a program from other host computers.

9. The recording medium in a computer, storing program-invocation-count measuring software according to claim 7 comprising:

means for making a third determination as to whether the received response signals have exceeded an upper limit; and means for terminating an operation of a process currently making the third determination when the received response signals have exceeded the upper limit.

* * * * *